(No Model.)
J. W. LANE.
REIN HOLDER.
No. 419,687. Patented Jan. 21, 1890.
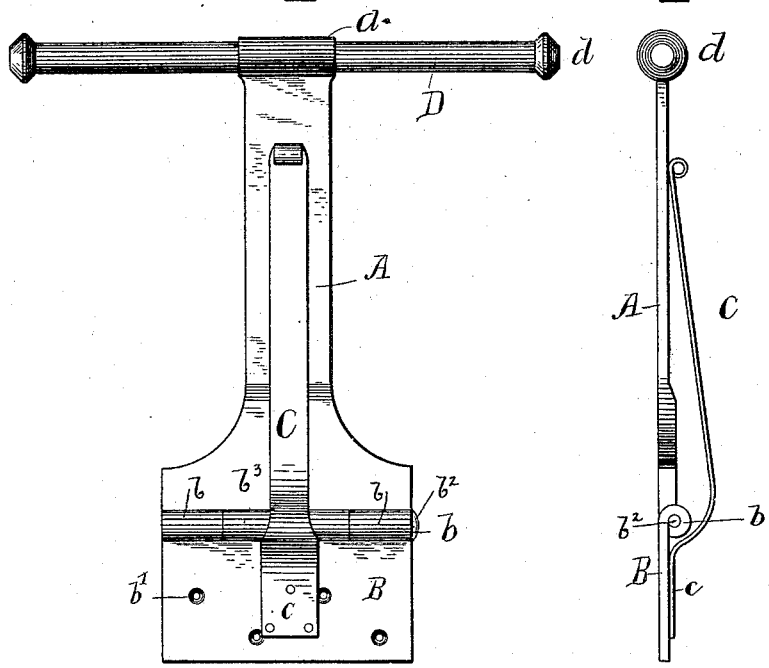
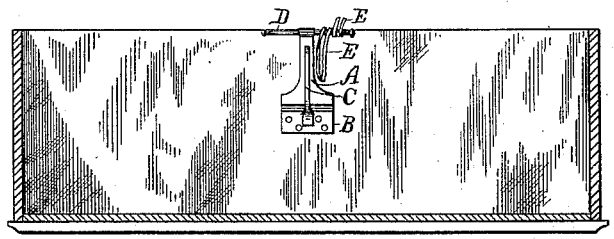
Witnesses
R. A. Balderson
F. C. Roach
John W. Lane, Inventor
by
Crosby & Dorian
his Attorneys

UNITED STATES PATENT OFFICE.

JOHN W. LANE, OF CENTERVILLE, IOWA.

REIN-HOLDER.

SPECIFICATION forming part of Letters Patent No. 419,687, dated January 21, 1890.

Application filed July 20, 1889. Serial No. 318,133. (No model.)

*To all whom it may concern:*

Be it known that I, JOHN W. LANE, a citizen of the United States, residing at Centerville, in the county of Appanoose and State of Iowa, have invented certain new and useful Improvements in Rein-Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to rein-holders; and its objects are, first, to provide a hitching device attachable directly to the vehicle; second, to secure the same in a serviceable and convenient locality; third, to adjust the same so that the restraining effect shall be in direct proportion to the stress on the line produced by the draft-animal; fourth, to provide for the ready and secure attachment of the reins to the holder, and, fifth, to accomplish these ends with structural simplicity and economy. I attain these purposes by the device illustrated in the accompanying drawings, in which—

Figure 1 represents a front elevation of my hitching device. Fig. 2 is a side elevation thereof, and Fig. 3 shows the manner of its joinder to the front end-gate of a wagon.

The same designations indicate corresponding parts in all the views.

It is well known to those accustomed to the use of horses that if they are caused to stop during a journey and left unrestrained they are apt to run away, induced either by a spontaneous desire for the shady retreat and abundant fodder of the home stable or influenced by fright, excitement, or sympathy with other horses about to start off. Convenient stationary hitching-posts are as rare in the city as they are in the country, while the common expedient of tying a horse to a tree is in many jurisdictions a sufficient cause to attend the reception of the nearest magistrate, to the enrichment of the latter; hence I have devised a portable hitching-standard adjustably secured to the front end-gate of a wagon, which will restrain the horse as perfectly as a stationary post.

To the front end-gate F of an ordinary vehicle of any description I screw by perforations $b'$ the stationary end B, which is curved at its upper terminus to afford a bearing $b$ for the headed pin $b^2$, that also passes through the corresponding base $b^3$ of the standard A, thus giving the latter a motion thereon denoted by a quadrant. This hinge-like joinder of the base B and standard or upright A is regulated by a curved spring C, whose lower terminus $c$ is joined rigidly to the base B, receiving thereform its rigidity. The top portion of the standard A is recessed at $a$ to hold immovably the bar D, having enlarged ends $d$, whereto the reins E are to be tied.

Having thus fully described my improvements, what I claim is—

As an improved article of manufacture, the rein-holder herein described, consisting of the plates A B, of different diameter, hinged together by the pin $d^2$, the plate A, having a terminal recess $a$ to accommodate the headed bar D, and the plate B, having rigidly attached centrally the end $c$ of the curved spring C, provided also with perforations $b'$, whereby the device may be secured to the front of a vehicle, substantially as described.

In testimony whereof I affix my signature in presence of two witnesses.

JOHN W. LANE.

Witnesses:
H. H. WRIGHT,
J. P. BROMGTON.